United States Patent

Moussa et al.

[11] Patent Number: 5,665,433
[45] Date of Patent: Sep. 9, 1997

[54] METHOD FOR IMPROVING PHYSICAL CHARACTERISTICS OF CURED CONTAINER COATINGS SUBJECTED TO STEAM PROCESSING

[75] Inventors: Youssef Moussa, Cincinnati; Kareem K. Kaleem, Loveland, both of Ohio

[73] Assignee: BASF Corporation, Southfield, Mich.

[21] Appl. No.: 575,197

[22] Filed: Dec. 20, 1995

[51] Int. Cl.$^6$ .................. B05D 3/02; B05D 3/04
[52] U.S. Cl. .................. 427/377; 427/379; 427/386; 427/388.2; 427/388.3
[58] Field of Search .................. 427/377, 379, 427/386, 388.2, 388.3

[56] References Cited

U.S. PATENT DOCUMENTS

| | | | |
|---|---|---|---|
| 4,081,417 | 3/1978 | Shen et al. | 260/29.2 EP |
| 4,193,904 | 3/1980 | Sekmakas et al. | 260/29.6 H |
| 4,227,980 | 10/1980 | Pregitzer et al. | 204/159.23 |
| 4,250,282 | 2/1981 | Dörries et al. | 525/509 |
| 4,758,632 | 7/1988 | Parekh et al. | 525/383 |
| 5,089,561 | 2/1992 | Forgione et al. | 525/127 |
| 5,169,884 | 12/1992 | Lindemann et al. | 524/44 |
| 5,474,811 | 12/1995 | Rehfuss et al. | 427/409 |
| 5,512,639 | 4/1996 | Rehfuss et al. | 525/456 |
| 5,593,735 | 1/1997 | Wu et al. | 427/388.3 |

*Primary Examiner*—Diana Dudash
*Attorney, Agent, or Firm*—Anne Gerry Sabourin

[57] ABSTRACT

A method for improving physical characteristics of cured container coatings subjected to steam processing is described herein. The method comprises applying a coating composition including a first component which is a carbamate functional compound and a second component which is a compound having a plurality of functional groups that are reactive with said carbamate group(s) on the carbamate functional compound. The coating composition is baked to form a cured film on the container. The container is filled and subjected to steam processing conditions suitable for food and beverage processing.

15 Claims, No Drawings

METHOD FOR IMPROVING PHYSICAL CHARACTERISTICS OF CURED CONTAINER COATINGS SUBJECTED TO STEAM PROCESSING

BACKGROUND OF THE INVENTION

1. Field of the Invention

The present invention is related to a method for improving physical characteristics of cured container coating compositions.

2. Description of the Related Art

In the area of coating compositions for packaging containers, coatings intended for use in containers used in the food and beverage industries generally are expected to meet a number of requirements in order to be commercially acceptable. The coating should adhere well to the base metal and should possess flexibility, extensibility and adhesion characteristics so as to withstand the processing of the container itself. The coating must be able to resist heat which is encountered during processing of the container and its contents. Additionally, the coating itself should not affect the taste of a food or beverage which is put into the container.

Container coatings are subjected to steam processing and prolonged bake cycles. Steam processing often causes a defect in container coatings called blush, which is a haziness in the film thought to be caused by absorption of water. Blush is particularly evident with container coatings that are subjected to high temperature and high humidity conditions during steam processing.

It is desirable that container coating compositions provide cured films that are resistant to defects caused by steam processing. These defects include water spotting and blush, as well as decreased solvent resistance and gloss retention.

Container coatings containing hydroxyl functional polymeric resins demonstrate various disadvantages such as poor resistance to blush and water spotting, diminished solvent resistance and poor gloss retention, upon exposure to steam processing.

An object of the present invention is to provide a coating composition and method for improving resistance of container films to degradation upon exposure to steam processing. A further object of the present invention is to provide a container coating composition comprising carbamate functional compounds and an article coated with said coating composition.

SUMMARY OF THE INVENTION

The present invention is directed to a coating composition comprising a) a first component which is a carbamate functional compound selected from the group consisting of
  (i) a non-polymeric organic compound having a molecular weight of from 75 to 2000 comprising a plurality of carbamate functional groups,
  (ii) a compound comprising a polymer backbone having a appended thereto at least one carbamate functional group, and
  (iii) mixtures thereof, and b) a second component comprising a compound having a plurality of functional groups that are reactive with said carbamate group(s) on component (a).

The present invention is further directed to a method for improving resistance of container films to defects such as blush and water spotting upon exposure to steam processing, while providing a cured film with good solvent resistance and gloss retention. The method of the present invention comprises a) applying to a container, a coating composition comprising a first component which is a carbamate functional compound and a second component comprising a compound having a plurality of functional groups that are reactive with said carbamate group(s) on the carbamate functional compound, b) baking said coating composition to form a cured film on the container, c) filling the container having a cured film thereon, and d) subjecting the filled container to steam processing at temperatures between 80° C. and 130° C. at pressures between 20 and 60 psi, for times ranging from 15 to 90 minutes.

The present invention is further directed to a coated article comprising a packaging container having thereon a cured film formed from a coating composition according to the present invention.

DETAILED DESCRIPTION OF THE INVENTION

It has been found that films formed from coating compositions containing carbamate modified compounds demonstrate improved resistance to blush and water spotting, and improved solvent resistance and gloss retention upon exposure to steam processing of containers, in comparison to coating compositions containing hydroxy functional polymeric resins.

Suitable carbamate substituted compounds for purposes of the present invention include both non-polymeric and polymeric organic compounds. Suitable non-polymeric organic compounds include those having a molecular weight of from 75 to 2000 and comprising a plurality of carbamate active hydrogens. Examples of carbamate modified polymers include acrylic and modified acrylic polymers, polyurethane polymers, epoxy and modified epoxy polymers, polyester polymers, alkyd polymers, and polyether polymers.

The carbamate substituted non-polymeric compounds having a molecular weight of from 75 to 2000, according to the invention can be prepared in a variety of ways. Simple commercially-available carbamate or urea compounds such as methyl carbamate or butyl carbamate may be used in the present invention as the carbamate substituted component. It may often be desirable to avoid the inclusion of hydroxyl groups in such compounds, as they may lead to the formation of vulnerable ether bridges during cure. The compounds useful as carbamate substituted compounds comprise a plurality of carbamate active hydrogens. This can be accomplished with a single primary (—O—CO—NH$_2$) carbamate group, but is more preferably accomplished with a plurality of carbamate groups, and even more preferably a plurality of primary carbamate groups.

One way to prepare carbamate substituted polymeric compounds is to react an alcohol ('alcohol' is defined herein as having one or more OH groups) with a urea to form a compound with carbamate group(s). This reaction is accomplished by heating a mixture of the alcohol and urea. Another technique is the reaction of a polyol with a monoisocyanate (e.g., methyl isocyanate) to form a compound with multiple secondary carbamate groups or to react an alcohol with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of a polyol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol or hydroxyalkyl carbamate is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", Chemical Review, v. 65, 1965.

Various alcohols can be used in the preparation of carbamate functional compounds according to the invention. They generally have from 1 to 160 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol, 1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Another approach is to react an isocyanate (preferably a diisocyanate, e.g., HDI, IPDI) with a compound such as hydroxypropyl carbamate to form a carbamate-capped polyisocyanate derivative as described in U.S. patent application Ser. No. 08/7098,176 now U.S. Pat. No. 5,152,639. The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediisocyanate and paraxylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of α, α, α', α'-tetramethyl xylene diisocyanate can be used. Biurets of isocyanates such as DESMODUR® N100 from Mobay may also be useful.

In one embodiment of the invention, a polyisocyanate is reacted with a compound containing an isocyanate-reactive group and a carbamate group, e.g., a hydroxyalkyl carbamate such as hydroxypropyl carbamate or hydroxyethyl carbamate. Alternatively, the polyisocyanate may be adducted with substituents that have the capability of forming carbamate groups after reaction with the polyisocyanate compound is completed. For example, the polyisocyanate can be reacted with a compound having an active hydrogen group (e.g., hydroxyl) and a cyclic carbonate group (e.g., the reaction product of glycidol and $CO_2$), and the cyclic carbonate groups then reacted with ammonia to form the carbamate functional groups. Alternatively, the polyisocyanate can be reacted with an active hydrogen group (e.g., hydroxyl) and an epoxy group, and then with $CO_2$ to convert the epoxy to cyclic carbonate, and the cyclic carbonate groups then reacted with ammonia to form the carbamate functional groups.

Another method of synthesis is to first react the isocyanate groups on the polyisocyanate with a compound having a group that is reactive with isocyanate and also a non-NCO functional group. This adduct is then reacted with a compound comprising at least one carbamate group or group that can be converted to carbamate and at least one group reactive with the non-NCO functional groups. Examples of non-NCO functional groups include carboxyl, epoxy, hydroxyl, amino. For example, an OH-functional polyisocyanate (which can be formed by reacting a polyisocyanate with an amino alcohol) can be reacted with the oxygen of a COO portion of the carbamate group on an alkyl carbamate or with the methylol group of methylol acrylamide (HO—$CH_2$—NH—CO—CH=$CH_2$). In the case of the COO group on an alkyl carbamate, the hydroxyl group on the polyurethane undergoes a transesterification with the COO group, resulting in the carbamate group being appended to the polyurethane. In the case of methylol acrylamide, the unsaturated double bond is then reacted with peroxide, $CO_2$, and ammonia as described above. The epoxy groups are then reacted with $CO_2$ to form cyclic carbonate groups, which are converted to carbamate groups by reaction with ammonia. Alternatively, an acid-functional polyisocyanate (which can be formed by reaction of a polyisocyanate with a hydroxy-functional carboxylic acid) can be reacted with acetic anhydride to generate an anhydride-functional triisocyanurate, which can then be reacted with an hydroxycarbamate.

The above-described polyisocyanates are adducted with compounds containing a carbamate group or group that can be converted to carbamate and a group that is reactive with the NCO- or non-NCO-functional group on the polyisocyanate. Carbamate-containing compounds that can be adducted onto the NCO groups of a diisocyanate or an isocyanurate are preferably active hydrogen-containing carbamates such as hydroxyalkyl carbamates (e.g., hydroxypropyl carbamate or hydroxyethyl carbamate). Compounds containing groups that can be converted to carbamate and groups that are reactive with NCO include active hydrogen-containing cyclic carbonate compounds convertible to carbamate by reaction with ammonia (e.g., the reaction product of glycidol and $CO_2$), monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia.

The compound (a) will generally have a molecular weight of 75–2000, and preferably from 75–1500. As used herein, molecular weight means number average molecular weight. Molecular weight can be determined by the GPC method. The glass transition temperature, $T_g$, of components (a) and (b) can be adjusted to achieve a cured coating having the $T_g$ for the particular application involved. The compound (a) is preferably used at levels between 3 to 50 percent (based on total resin solids of the coating composition), and more preferably between 30 to 50 percent.

The carbamate groups on compound (a) can be represented by the formula:

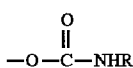

wherein R is H or alkyl of 1 to 4 carbon atoms. Preferably, R is H or methyl, and more preferably R is H.

As stated above, various polymers may be used for purposes of the present invention. Polyesters, including alkyd polymers having carbamate functionality may also be formed by (a) reacting a hydroxyalkyl cyclic carbonate with ammonia, ammonium hydroxide, or a primary amine to form a dihydric alcohol having a carbamate group appended thereto, (b) reacting the dihydric alcohol from (a) and a cyclic anhydride to form a half-ester diacid having a carbamate group appended thereto, and (c) reacting a mixture comprising the half-ester diacid from step (b) and a polyol to form a polyester having carbamate groups appended thereto.

The hydroxyalkyl cyclic carbonate used in the practice of the invention can be prepared by a number of approaches. Certain hydroxyalkyl cyclic carbonates like 3-hydroxypropyl carbonate (i.e., glycerine carbonate) are commercially available. Cyclic carbonate compounds can be synthesized by any of several different approaches. One approach involves reacting an epoxy group-containing compound with $CO_2$, preferably under pressure with a catalyst. Useful catalysts include any that activate an oxirane ring, such as tertiary amine quaternary salts (e.g., tetramethyl ammonium bromide), tin and/or phosphorous complex salts (e.g., $(CH_3)_3SNI{:}(CH_3)_4PI$). Epoxides can also be reacted with b-bytyrolactone in the presence of such catalysts. In another approach, a glycol like glycerine is reacted at temperatures of at least 80° C. (usually under reflux) with diethyl carbonate in the presence of a catalyst (e.g., potassium carbonate) to form a hydroxyalkyl carbonate. Alternatively, a functional compound containing a ketal of a 1,2-diol having the structure:

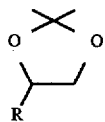

can be ring-opened with water at temperatures of at least 60° C., preferably with a trace amount of acid, to form a 1,2-glycol, which is then further reacted with diethyl carbonate to form the cyclic carbonate.

Cyclic carbonates typically have 5–6-membered rings, as is known in the art. Five-membered rings are preferred, due to their ease of synthesis and greater degree of commercial availability. Preferred hydroxyalkyl cyclic carbonates used in the practice can be represented by the formula:

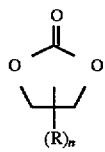

where R is a hydroxyalkyl group of 1–18 carbon atoms, preferably 1–6 carbon atoms, and more preferably 1–3 carbon atoms, and n is 1 or 2, which may be substituted by one or more other substituents such as blocked amines or unsaturated groups. More preferably, R is —$C_mH_{2m}$OH where the hydroxyl may be primary or secondary and m is 1 to 8, and even more preferably, R is —$(CH_2)_p$—OH where the hydroxyl is primary and p is 1 to 2.

In step (a) of the process to form the carbamate substituted polyester, the hydroxyalkyl cyclic carbonate is reacted with ammonia, ammonium hydroxide, or a primary amine. This reaction is performed under mild conditions (e.g., 0°–60° C. in water, methanol, or other known solvents. Reaction with ammonia or ammonium hydroxide yields a primary carbamate, and is preferred. Reaction with a primary amine yields a secondary (N-substituted) carbamate. The ring-opening reaction of ammonia, ammonium hydroxide, or a primary amine with the cyclic carbonate group yields a carbamate group as described above and also a primary or secondary hydroxyl group, which takes part in the polyester-forming reaction in the next step of the invention. This reaction product thus comprises a carbamate group, the hydroxyl group that was on the hydroxyalkyl cyclic carbonate, and a hydroxyl group formed by the ring opening of the cyclic carbonate group.

In step (b) of the above described process, the diol having a carbamate group that was produced in step (a) is reacted with an anhydride to form a half-ester diacid having a carbamate group appended thereto. Useful anhydrides include phthalic anhydride, terephthalic anhydride, trimellitic anhydride, pyromellitic anhydride, hexahydrophthalic anhydride, methyl hexahydrophthalic anhydride, maleic anhydride, glutamic anhydride, 1,2,4,5-bis-anhydride cyclohexane. The anhydride reaction is typically carried out at temperatures under 120° C., preferably under 110° C., and most preferably under 90° C., which can be advantageous because it doesn't subject the carbamate diol to harsh reaction conditions that could lead to side reactions such as re-closure to form the original cyclic carbonate ring.

In step (c) of the process, a mixture comprising the reaction product of step (b) and a polyol is reacted to form a polyester. Useful polyols generally contain more than 2, preferably 2 to about 10 carbon atoms, more preferably about 2 to 8 carbon atoms, in addition to having 2 to about 6, preferably 2 to about 4, hydroxyl groups. Some preferred examples of the polyols are one or more of the following: neopentyl glycol, ethylene glycol, propylene glycol, 2,3-butylene glycol, butanediol, hexamethylenediol, 1,2-cyclohexanedimethanol, 1,3-cyclohexanedimethanol, 1,4-cyclohexanedimethanol, trimethylol propane, pentaerythritol, neopentyl glycol hydroxypivalate diethylene glycol, triethylene glycol, tetraethylene glycol, dipropylene glycol, polypropylene glycol, hexylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, 1,4-butanediol, 2,2,4-trimethyl 1,3-pentanediol, 1,2-cyclohexanediol, 1,3-cyclohexanediol, 1,4-cyclohexanediol, glycerol, trimethylolpropane, trimethylolethane, 1,2,4-butanetriol, 1,2,6-hexanetriol, dipentaerythritol, tripentaerythritol, mannitol, sorbitol, methylglycoside, like compounds apparent to those skilled in the art, and mixtures thereof. Depending on the properties desired for the final resin, certain other polyols can be incorporated into the reaction mixture, such as fatty polyols, phenolic polyols (e.g., hydroquinone, phenolphthalein, bisphenol A), oligomeric, or polymeric polyols (e.g., preformed polyester polyols).

The reaction mixture in step (c) may also comprise additional polyacids. The amount of such additional polyacid is determined by the desired level of carbamate functionality for the polyester. Polyacids useful in the practice of the invention may contain about 2 to 34 carbon atoms in aliphatic or aromatic moieties, and at least 2, preferably no more than 4, carboxyl groups which may, alternatively, be present in the form of anhydride groups. The polyacids may be polyacids themselves or cyclic anhydrides of polyacids, which can be ring opened by the carbamate-containing diol or other polyols during the polyester reaction to form acid groups for polyester condensation. Examples of useful polyacids include phthalic anhydride, phthalic acid, terephthalic acid, isophthalic acid, adipic acid, succinic acid, glutaric acid, fumaric acid, maleic acid, cyclohexane dicarboxylic acid, trimellitic anhydride, azelaic acid, sebasic acid, dimer acid, pyromellitic dianhydride, substituted maleic and fumaric acids such as citraconic, chloromaleic, or mesaconic acids, and substituted succinic acids such as aconitic and itaconic acids. Mixtures of polyacids can be employed. Additionally, other components, such as reaction modifiers, catalysts, solvents, dispersing agents, and the like as is known in the art.

The proportions of the polyol, the reaction product of step (b), and any other active compounds may be chosen so as to provide an acid-terminated polyester or a hydroxyl-terminated polyester. This can be accomplished by utilizing a stoichiometric excess of polyacid or polyol.

If water-solubility is desired, it is important to build water-stabilizing groups into the polyester. This can be accomplished by incorporating water-stabilizing polyether polyols into the reaction mixture so they are incorporated into the polyester or by utilizing dimethylol propionic acid as a polyol in the reaction mixture.

An intermediate polyester resin may be prepared having hydroxyl or acid terminal groups by the use of an excess of polyacid or polyol component in the polyester reaction mix. The terminal groups of the resin may then be controlled by reaction of those terminal groups with an excess of a capping agent, as is known in the art. If the intermediate resin is acid terminated, a mono- or multi-functional alcohol may be used to terminate the reaction (cap the free acid groups) at the desired stage (determined by the viscosity and concentration of isocyanate groups present). Multi-functional alcohols, such as ethylene glycol, trimethylolpropane and hydroxyl-terminated polyesters, can also be employed in this manner. If a resin with only carbamate functionality and no hydroxyl functionality, the intermediate polyester resin is preferably capped with a monofunctional alcohol (e.g., n-butanol). Likewise, a hydroxyl-terminated intermediate resin can be capped by reaction with an excess of mono- or polyfunctional acid.

Polyesterification reactions are normally carried out at temperatures between 140° C. and 260° C., and for a time ranging from 3 to 15 hours with or without the use of acid esterification catalysts such as phosphorous acid or toluene sulfonic acid present at levels of 0.01 to 2.0 weight percent. The reaction is optionally carried out in the presence of a solvent, such as an aromatic hydrocarbon, as is known in the art. The reaction may be carried out as a single-stage reaction or as a multistage reaction such as a two-stage reaction. The polyesters thus produced generally have a number average molecular weight of from 1000 to 60,000.

A carbamate functional acrylic may be used as a polymeric carbamate functional compound. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126, 747, 4,279,833, 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an $\alpha,\beta$,-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing a carbamate functional acrylic polymer used in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as the carbamate functional compound involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to transesterify an acrylate polymer with a hydroxyalkyl carbamate.

The carbamate functional polymer will generally have a molecular weight of 2000–20,000, and preferably from 4000–6000. Molecular weight can be determined by the GPC method using a polystyrene standard. The carbamate content of the polymer, on a molecular weight per equivalent of carbamate functionality, will generally be between 200 and 500, and preferably between 300 and 350. The glass transition temperature, $T_g$, of components (a) and (b) can be adjusted to achieve a cured composition having the $T_g$ for the particular application involved. In the case of a coating, the average $T_g$ of unreacted components (a) and (b) should be between 10° C. and 80° C., with the individual $T_g$'s being adjusted to achieve optimum performance.

The carbamate functional compound may comprise a polymer represented by the randomly repeating units according to the following formula:

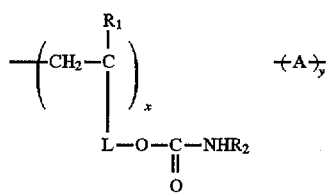

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

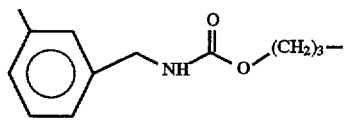

$-(CH_2)-$, $-(CH_2)_2-$, $-(CH_2)_4-$, and the like. In one preferred embodiment, —L— is represented by —COO—L'— where L' is a divalent linking group. Thus, in a preferred embodiment of the invention, the carbamate functional polymer is represented by randomly repeating units according to the following formula:

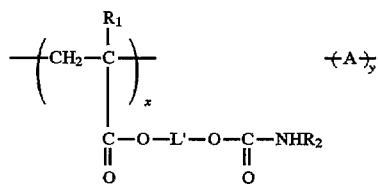

In this formula, $R_1$, $R_2$, A, x, and y are as defined above. L' may be a divalent aliphatic linking group, preferably of 1 to 8 carbon atoms, e.g., $-(CH_2)-$, $-(CH_2)_2-$, $-(CH_2)_4-$, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

The composition of the invention is cured by a reaction of the carbamate-functional compound with a component (b) that is a compound having a plurality of functional groups that are reactive with the carbamate groups on the polymer. Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in the concurrently-filed U.S. pat. application entitled "Carbamate-Defunctionalized Aminoplast Curing for Polymer Compositions" in the name of John W. Rehfuss. Component (b) is included in a coating composition in an amount between 1.0 and 50.0 percent by weight, preferably between 5.0 and 40% by weight, based on total coating composition weight.

The composition of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

A solvent may optionally be utilized in a curable composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional polyester as well as the curing agent. In general, depending on the solubility characteristics of the components, the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The curable composition used in the practice of the invention may include a catalyst to enhance the cure reaction. For example, when aminoplast compounds, especially monomeric melamines, are used, a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the curable composition in an amount of from about 0.01 weight percent to about 99 weight percent, preferably from about 1.0 weight percent to about 60 weight percent, and more preferably from about 1.0 weight percent to about 20 weight percent, based on total coating composition weight.

Coating compositions can be coated on the article by any of a number of techniques well-known in the art. These include, for example, spray coating, dip coating, roll coating, curtain coating, and the like. For containers, spray coating is preferred.

Any additional agent used, for example, dyes, pigments, extenders, surfactants, fillers, stabilizers, wetting agents, dispersing agents, adhesion promoters, anti-corrosion agents, flow control agents, thixotropic agents, antioxidants, light stabilizers, etc. may be incorporated into the coating composition. While the agents are well-known in the prior art, the amount used must be controlled to avoid adversely affecting the coating characteristics.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular cross-linking agents, however they generally range between 150° C. and 220° C. The curing time will vary depending on the particular components used, and physical parameters such as the thickness of the layers, however, typical curing times range from 5 to 25 minutes, and preferably 5–10 minutes for blocked acid catalyzed systems.

The coating composition may be used for the external or internal coating of containers. The coating may be applied to the container and/or to container components. The coating compositions are suitable for any substrate including metal, glass, plastic, wood, cloth or foam.

Steam processing is used to for a number of food processing procedures including pasteurizion, sterilization, and cooking the food and beverage products. Beverages, including but not limited to, beer, milk drinks, juices and juice drinks are all subjected to heat treatment in the containers in which they are sold. Likewise, food products for human and animal consumption including vegetables, meats and fruits are subjected to processing in containers in which they are sold. A short pasteurization time may be used for beverages such as beer, which would require processing at the 80° C. temperature range for about 15–30 minutes, while a container of uncooked meat would require a considerably longer processing time, at higher temperatures, for example 90 minutes at 125° to 130° C. Generally, steam processing at temperatures of 120°–130° C. for times between 45 and 90 minutes is referred to as steam retort. Processing times and temperatures vary depending on the contents and amount of food or beverage to be processed.

The coating composition is used in one embodiment as the inner coating of a metallic food or beverage container. The coated container is filled and then subjected to steam processing conditions standard for processing and/or pasteurization of the contents of the container. Steam processing is generally conducted at temperatures between 80° C. and 130° C., at pressures between 20 and 60 psi, for times ranging from 15 to 90 minutes.

Coating compositions of the present invention demonstrate ability to resist corrosion, good adhesion to metal substrates, flexibility, resistance to water spotting, hardness and gloss retention. The coating does not adversely affect the taste of the food or beverage content of the container.

The invention has been described in detail with reference to preferred embodiments thereof. It should be understood, however, that variations and modifications can be made within the spirit and scope of the invention.

EXAMPLES

Example 1

Preparation of Polyol Having at Least One Pendant Carbamate Group

A three neck round bottom flask was fitted with a condenser, stirrer, ammonia inlet tube fitted with porous fitted glass tip and thermocouple. This apparatus was then placed in a metal container which was filled with dry ice, water, acetone and sodium chloride as a cold bath in order to control the temperature of the reaction. This reactor was loaded with hydroxyalkyl cyclic carbonate (Glycar®) with an equal molar amount of methanol. The temperature of the reaction components was dropped to 15° C. at which time ammonia gas was bubbled through the reaction until the temperature of the reaction increased to 32° C. At this time the reaction continued to be stirred and was cooled back down to 15° C. This procedure was continued until a carbonate peek was no longer seen in the infrared spectrum. This should take approximately 12 hours depending on the batch size and ammonia concentration.

After all the Glycar® was converted to the glycol carbamate the reactor apparatus was converted so that a heated vacuum strip can be performed. The vacuum strip was started at room temperature to prevent bumping or over expansion of the system. The temperature was slowly increased (system permitting) to 80° C. under full vacuum 28 in Hg. The vacuum strip was complete when the gas chromatograph was clean of ammonia and methanol.

Example 2

Preparation of Diacid Aliphatic Intermediate with Pendant Carbamate Functionality A three neck round bottom flask was fitted with a perforated 5 plate distilling column, stirrer, adapter Claisen with solvent trap 50 milliliters, condenser, nitrogen inlet tube and thermocouple. This reactor was loaded with the following:

| Ingredients | Weight |
|---|---|
| Carbamate glycol | 600.00 |
| Hexahydro methyl phthalic anhydride | 1493.33 |
| Methyl amyl ketone (MIAK) | 600.00 |
| | 2693.33 |

The agitator was started and the vessel charged with 10 grams of toluene to the collection trap and slowly heated to 110° C. Once the reaction reached 110° C., the reaction was held at this temperature for two hours (some distillation of water was noticed). After the two hour hold the acid number and milliequivalents of the reaction was checked. The milliequivalents was in the range between (211–220)

Example 3

Preparation of Linear Polyester Polyol with Pendant Functional Groups

A three neck round bottom flask was fitted with a perforated 3 plate distilling column, stirrer, Claisen adapter with solvent trap 50 milliliters, condenser, nitrogen inlet tube and thermocouple. This reactor was loaded with the following:

| Ingredients | Weight |
| --- | --- |
| Example 2 intermediate precursor | 980.00 |
| 1,6 Hexane diol | 190.74 |
| Xylene | 50.00 |
| Dibutyl tin dilaurate | 0.15 |
| | 1220.89 |

The agitator and nitrogen inlet sparge were started. 30 grams of toluene was charged to the collection trap and slowly heated to 137.7° C. Once the reaction reached 137.7° C., the reaction was held at this temperature for four hours (azeotrope of toluene and water was observed). After the four hour hold, the temperature was slowly increased (10° every half hour) to 170° C. where a very strong azeotrope of toluene and water was observed. The reaction temperature was held at 170° C. for 8 hours, at which time the first acid number was taken. The acid number was then taken every hour until the reaction reached a value between (5–10)AN or (0.089–0.178) milliequivalents per gram. After the reaction had extended to the predetermined acid number, the toluene was allowed to come over with the water until all the toluene was collected. The reaction was cooled to 100° C. and 700 grams of Exxate® 800 was added to the reaction, and the batch was allowed to continue to cool to room temperature.

Example 4

Carbamate-Functional Acrylic

A three-necked 5-liter round bottom flask was fitted with an agitator at the center neck and a Claisson® adapter to one of the side necks. A thermal-couple and a nitrogen purge were fed through the center of the Claisson® adapter and a monomer feed line was fed through the side neck of the adapter. The second side neck of the flask was fitted with column packing material, a convertible liquid/liquid continuous extractor, and a water cooled condenser. The liquid/liquid extractor contained 100 g of deionized water to extract the methanol from the methanol/aromatic solvent distillate mixture.

862.7 g Urethane-grade mixed aromatics solvent (Solvesso® 100), 418.9 g methyl carbamate, 4.5 g dibutyltin oxide, and 20.0 g methanol were charged to the flask. The mixture was agitated and heated to 130° C. with a nitrogen purge. As distillate started to condense to the liquid/liquid extractor, the nitrogen purge was discontinued.

562.5 g of hydroxyethyl methacrylate, 194.0 g styrene, 155.2 g 2-ethylhexyl methacrylate, 381.4 g 2-ethylhexyl acrylate, 116.4 g Vazo®67 (2,2'-Azobis (2-Methylbutanenitrile), DuPont), and 93.5 g Solvesso®100 were charged to a separate container. This mixture was pumped to the reaction flask over a period of 4 hours. At the conclusion of this first feed, a second addition of 19.4 g Vazo® 67 and 112.2 g Solvesso® 100 was fed over 30 minutes. After the second initiator feed, 487.0 g toluene, and 4.5 g dibutyltin oxide were added to the reaction mixture. The reaction mixture was then held for 6 hours, or until the hydroxyl groups were 90–95% consumed as determined by hydroxyl number titration, at 135° C. during which time distillate containing methanol and toluene condensed to the liquid/liquid extractor. The organic layer was allowed to overflow back to the reaction flask. When the aqueous layer containing methanol nearly completely filled the extractor and before any of this layer could overflow to the reaction mixture, the extractor was removed temporarily, emptied, and refilled with another 100 g deionized water during the course of the reaction.

After the reaction was complete, the batch was cooled to 110° C. and the extractor and condenser removed. The batch was then vacuum stripped for 1 hour at 110° C. to remove toluene and residual excess methyl carbamate. After stripping, the carbamate functional acrylic was reduced to 65% solids with a 1/1 mixture of amyl acetate and Ektasolve® EEP solvent (ethoxyethyl propionate, Eastman Chemical), cooled and filtered. A carbamate functional acrylic copolymer resin having a weight average molecular weight of 3615 Daltons, a polydispersity of 1.8, a carbamate equivalent weight of 366 g/eq., and a calculated glass transition temperature of 33° C. was obtained.

Example 5

Carbamate-Modified Melamine

A three-necked 5-1 round-bottomed flask was fitted with a vacuum sealed agitator at the center neck and a thermocouple at a side neck to monitor the reaction temperature. The second side neck as temporarily fitted with a water cooled condenser. Vacuum was applied through a collecting vessel and supercooled condenser via this side neck of the reaction flask.

1708 g Hexamethoxylated monomeric melamine and 1044 g butyl carbamate were charged to the flask. The mixture was homogenized with agitation while heating slowly to 60° C. As the mixture reached 60° C., 1.2 g dodecylbenzyl sulfonic acid was charged to the vessel. The condenser was removed and the flask fitted to the vacuum set-up. The mixture was heated to 100° C. at a rate of 1° C./min. When the mixture reached 70° C., 15–20' vacuum was applied. The methanol was collected as it condensed in the supercooled condenser. A stoichiometric amount of methanol, 279 g, was removed in 2.5 hours at 25" vacuum and 100° C. After this amount was removed, the heat and vacuum were discontinued. The vessel was charge with 433 g xylene, homogenized, and carbamate-modified melamine separated from the mixture.

Example 6

Container Coating Composition with Hydroxy Functional Acrylic

| Ingredient | Amount (% By Weight) |
| --- | --- |
| Hydroxy Functional Acrylic Resin[1] | 77.70 |
| Hexamethoxymelamine crosslinker | 7.00 |
| Acid Catalyst[2] | 0.36 |
| Xylene | 14.94 |
| Total | 100.00 |

[1]61.4% Total non-volatile content arylic polymer based on 2-ethyl hexyl methacrylate, methyl methacrylate, hydroxyethyl methacrylate in Solvesso ® 100 solvent.
[2]Cycat 600 from Cytec.

Example 7

Container Coating Composition with Carbamate Functional Acrylic

| Ingredient | Amount (% By Weight) |
|---|---|
| Carbamate Functional Acrylic Resin[1] | 89.32 |
| Hexamethoxymelamine crosslinker | 7.00 |
| Acid Catalyst[2] | 0.36 |
| Xylene | 3.32 |
| Total | 100.00 |

The coating compositions from Examples 6 and 7 were drawn down side by side using a draw down bar over primed tinplate and baked for 10 minutes at 400° F. Properties of the films were then examined. The results are shown in Table 1.

TABLE 1

| Physical Properties of Draw Down Coatings | | |
|---|---|---|
| Property | Example 6 | Example 7 |
| Solvent Resistance[1] | 150 | 150 |
| Gloss | good | excellent |
| Film Clarity | good | excellent |

[1]Measured by rubs with a methyethyl ketone saturated cloth.

The tinplate with the baked films were then placed in a steam retort set at 265° F. for up to 90 minutes. After cooling to room temperature the films were again examined. The results are set forth in Table 2.

TABLE 2

| Physical Properties of Coatings after Steam Processing | | |
|---|---|---|
| Property | Example 6 | Example 7 |
| Solvent Resistance[1] | 18 | 100 |
| Gloss | hazy | excellent |
| Blush Resistance[2] | severe | no blush |
| Water Spotting | severe | none |
| Film Hardness | poor | good |

[1]Measured by rubs with methyethyl ketone saturated cloth.
[2]Evaluation following steam retort at 265° F. for 90 minutes.

Example 8

Preparation of Hydroxy Functional Alkyd 397 grams of glcerine, 1220 grams of lauric acid, 795 grams of phthalic anhydride, 12.6 grams of pentaerythritol, 0.06 grams of esterification catalyst and 3.45 grams of Aromatic 100 as refluxing solvent were charged to a glass reactor equipped with a stirrer. The mixture was heated under inert gas until azeotrope of water and Aromatic 100 started forming. The inert gas was then turned off and the vapors formed were condensed and collected in a Dean-Stark tube. The water of esterifcation was separated from the organic solvent and the solvent was returned to the reactor. The reaction mixture was heated to a temperature of 220° C., and held at that temperature until the acid number of the reaction product was less than 10. The reaction product was cooled and dissolved in 540 grams of Aromatic 100. the product is a solution of non-air drying hydroxy functional alkyd with a solids content of 76.0%.

Example 9

Preparation of Carbamate Functional Alkyd 700 grams of the alkyd solution from Ex. 8 were charged into a reactor equipped with a stirrer. To this 153 grams of methyl carbamate, 15.6 grams of methanol and 6.41 grams of dibutyl tin oxide were added. The reaction mixture was heated slowly to 130° c. and the resulting vapors were condensed and collected. The reaction mixture was held at 130° C. until the transcarbamation was completed. The degree of transcarbamation was monitored using IR. When all of the hydroxy functionality had been converted into carbamate functionality, the reaction product was cooled. The resulting solution is a carbamate functional resin with the same polymer backbone as that of Example 8.

Examples 8A, 8B and 9A

Coating Compositions Prepared from Ex. 8 and 9 Resins

| Ingredient | Ex. 8A Amount (grams) | Ex. 8B Amount (grams) | Ex. 9A Amount (grams) |
|---|---|---|---|
| Hydroxy Functional Resin from Ex. 8 | 50.0 | 50.0 | — |
| Carbamate Functional Resin from Ex. 9 | — | — | 50.0 |
| Hexamethoxymelamine crosslinker[1] | 7.00 | 7.00 | 8.30 |
| Acid Catalyst[2] | 0.23 | 0.90 | 0.20 |
| Butylcellosolve | 7.00 | 7.00 | 9.00 |

[1]Resamine 745 from Monsanto
[2]Sulfonic acid catalyst from Cytec

Table 3
Physical Properties for Coating Formulations 8A, 8B and 9A

The coatings were drawn side by side on primed tinplate and cured for 10 minutes at 210° C.

TABLE 3

| Physical properties for Coating formulations 8A, 8B and 9A The coatings were drawn side by side on primed tinplate and cured for 10 minutes at 210° C. | | | |
|---|---|---|---|
| Property | Example 8A | Example 8B* | Example 9A |
| Solvent Resistance[1] | <20 | <40 | >130 |
| Gloss | good | good | excellent |
| Hardness | good | hard | hard |

[1]Number of rubs with a cloth saturated with methyl ethyl ketone

Table 4
Physical Properties of Coatings Subjected to Steam Processing

Panels with coatings from Ex. 8A, 8B and 9A were than placed in a steam retort and processed for 90 minutes at 127° C. After cooling to room temperature the panels were evaluated for physical properties.

TABLE 4

| Physical Properties of Coatings Subjected to Steam Processing Panels with coatings from Ex. 8A, 8B and 9A were then placed in a steam retort and processed for 90 minutes at 127° C. After cooling to room temperature the panels were evaluated for physical properties. | | |
|---|---|---|
| Property | Example 8A | Example 9 |
| Solvent Resistance[1] | <1 | >50 |
| Gloss | total loss | excellent |
| Blush | severe | no blush |
| Film Hardness | tacky | hard |

[1]Rubs with cloth saturated with methylethyl ketone.
[2]Evaluated after steam processing at 127° C. for 90 minutes.

We claim:
1. A method for obtaining cured container coatings resistant to degradation caused by steam processing, comprising a) applying to a container, a coating composition comprising a first component which is a primary carbamate functional compound and a second component comprising a compound having a plurality of functional groups that are reactive with said carbamate group(s) on the carbamate functional compound, b) baking said coating composition to form a cured film on the container, c) filling the container having a cured film thereon, and d) subjecting the filled container to steam processing at temperatures between 80° C. and 130° C. at pressures between 20 and 60 psi, for times ranging from 15 to 90 minutes.

2. A method according to claim 1, wherein the coating composition applied to a container comprises a carbamate functional compound selected from the group consisting of (i) a non-polymeric organic compound having a molecular weight of from 75 to 2000 comprising a plurality of carbamate functional groups, (ii) a compound comprising a polymer backbone having appended thereto at least one carbamate functional group, and (iii) mixtures thereof.

3. A method according to claim 1, wherein the coating composition applied to a container comprises as the carbamate functional compound, compound (i) which is the reaction product of a polyisocyanate and a hydroxyalkyl carbamate.

4. A method according to claim 2, wherein the coating composition applied to a container comprises as the carbamate functional compound, compound (i) which is the reaction product of a polyol and a compound selected from the group consisting of monoisocyanates, polyisocyanates, and urea.

5. A method according to claim 2, wherein the coating composition applied to a container comprises as the carbamate functional compound, compound (i) which is the reaction product of ammonia or a primary amine with the reaction product of a polyol and phosgene.

6. A method according to claim 2, wherein the coating composition applied to a container comprises as the carbamate functional compound, compound (i) having a molecular weight of 75 to 1500.

7. A method according to claim 2, wherein the coating composition applied to a container comprises as the carbamate functional compound, compound (ii) having a polymer backbone selected from the group consisting of acrylic and modified acrylic polymers, polyurethane polymers, epoxy and modified epoxy polymers, polyester polymers, alkyd polymers, polyether polymers and mixtures thereof.

8. A method according to claim 2, wherein the coating composition applied to a container comprises as the carbamate functional compound, compound (ii) which is represented by randomly repeating units according to the formula:

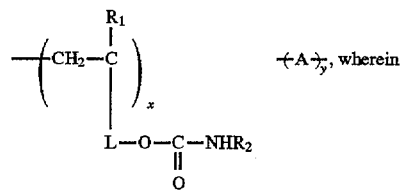

$R_1$ represents H or $CH_3$, $R_2$ represents H, alkyl, or cycloalkyl,

L represents a divalent linking group,

A represents repeat units derived from one or more ethylenically unsaturated monomers, x represents 10 to 90 weight %, and y represents 90 to 10 weight %.

9. A method according to claim 8, wherein $R_1$ represents $CH_3$ in compound (ii).

10. A method according to claim 8, wherein x represents 40 to 60 weight % and y represents 60 to 40 weight %.

11. A method according to claim 8 wherein —L— is represented by the formula —COO—L'— where L' is a divalent linking group in compound (ii).

12. A method according to claim 8 wherein the coating composition applied to the container comprises as the second component (b) a compound selected from the group consisting of aminoplast resin, polysiloxanes, polyanhydrides, and compounds having a plurality of active methylol functional groups.

13. A method according to claim 8 wherein the coating composition applied to the container comprises as the compound having a plurality of functional groups that are reactive with said carbamate group(s) on the carbamate functional compound, an aminoplast resin.

14. A method according to claim 13 wherein the coating composition applied to the container comprises as the compound reactive with carbamate groups, an aminoplast resin which is melamine formaldehyde resin.

15. A method according to claim 14 wherein the coating composition applied to the container comprises as the compound reactive with carbamate groups, a melamine formaldehyde resin which is fully or partially alkylated.

* * * * *